(12) United States Patent
Horin et al.

(10) Patent No.: US 7,509,886 B2
(45) Date of Patent: Mar. 31, 2009

(54) MECHANICAL STRUCTURE PROVIDING SIX DEGREES OF FREEDOM

(75) Inventors: Ronen Ben Horin, Haifa (IL); Moshe Shoham, M. P. Hamovil (IL); Hagay Bamberger, Kfar Hasidim (IL)

(73) Assignees: Rafael Armament Development Ltd., Haifa (IL); The Technion Research & Development Foundation Ltd., Haifa (IL)

( * ) Notice: Subject to any disclaimer, the term of this patent is extended or adjusted under 35 U.S.C. 154(b) by 696 days.

(21) Appl. No.: 10/991,644

(22) Filed: Nov. 8, 2004

(65) Prior Publication Data

US 2005/0132837 A1  Jun. 23, 2005

(30) Foreign Application Priority Data

Nov. 13, 2003 (IL) .................................. 158870

(51) Int. Cl.
*B25J 17/00* (2006.01)
(52) U.S. Cl. ...................... 74/490.05; 901/15
(58) Field of Classification Search ............ 901/14–26, 901/8, 27–29; 74/490.01–490.06, 490.08, 74/490.09, 479.01; 108/4; 310/40 MM; 434/58; 414/735
See application file for complete search history.

(56) References Cited

U.S. PATENT DOCUMENTS

| | | | |
|---|---|---|---|
| 4,806,068 A * | 2/1989 | Kohli et al. .................. | 414/735 |
| 5,279,176 A * | 1/1994 | Tahmasebi et al. ....... | 74/490.01 |
| 5,656,905 A * | 8/1997 | Tsai ....................... | 318/568.21 |
| 6,218,762 B1 | 4/2001 | Hill et al. | |
| 6,675,671 B1 * | 1/2004 | Jokiel et al. .............. | 74/490.09 |

OTHER PUBLICATIONS

Fan L. et. al, "Self-assembled . . . Alignment", Proceedings of Inter. Solid State Sensors and Actuators Conf. (Transducers'97), Chicago, IL, USA, 1997, pp. 319-322.
Daneman et al., "Linear Vibromotor for Positioning Optical Components", Journal of Microelectromechanical Systems, vol. 5, No. 3, Sep. 1996, pp. 159-165.
Pister et al., "Microfabricated Hinges", Sensors and Actuators A-Physical, vol. 33, No. 3, 1992, pp. 249-256.

* cited by examiner

*Primary Examiner*—Richard W L Ridley
*Assistant Examiner*—Alan B Waits
(74) *Attorney, Agent, or Firm*—Merchant & Gould P.C.

(57) ABSTRACT

The invention relates to a mechanical structure which provides motion in six degrees of freedom, which comprises: (a) a main plate; (b) a base; (c) at least three supporting structures, each comprising a lower, bridge-like section supported by the base, and an upper section connected to said bridge section and to said main plate, wherein: (I) said bridge-like structure comprising two supporting plates, two intermediate plates, and one middle plate, all being serially connected one to another by means of four transversal hinges; (II) each pair of said supporting plates being slidable in linear displacement parallel to the base; (III) said upper section comprising two plates, a lower plate connected to said middle plate by means of a hinge transversal to said lower plate but longitudinal with respect to said middle plate, and an upper plate connected to said lower plate by means of a longitudinal hinge and to said main plate by means of a transversal hinge; (d) At least six linear motors connected each to a corresponding supporting plate, for applying a force thereon in order to effect a linear displacement of said plate; and (e) control means for determining the linear displacement of each linear motor.

11 Claims, 4 Drawing Sheets

MECHANICAL STRUCTURE PROVIDING SIX DEGREES OF FREEDOM

FIELD OF THE INVENTION

The present invention relates to a mechanical structure or mechanism that can impart to a main component thereof displacements according to six degrees of freedom (a degree of freedom relates to a linear displacement or rotation). Said main plate may embody or support, for example, any one of various active or passive devices, such as electronic microcircuits, cameras, probes, sensors, light guiding and/or focusing elements. The structure of the invention may be controlled to impart desired motions and/or orientations to said main plate and therefore to active devices placed thereon. Said mechanical structure, hereinafter also referred to as "robot" or "micro-robot" is so formed, and comprises elements making possible for embodying it by MEMS technology. The invention also comprises a process for making such a structure.

BACKGROUND OF THE INVENTION

As said, the invention relates to a mechanical structure for a robot, having six degrees of freedom. Various structures for robots having six degrees of freedom exist in the art. Some of those robots are also classified as parallel robots.

Micro-Electro-Mechanical-Systems (MEMS) are known in the art and are being increasingly developed for a variety of applications, such as sensors, pumps, valves, light attenuators, optical scanners, etc. The forces for causing the desired motions in MEMS may be electromagnetic, electrostatic, piezoelectric, thermal etc. One, two, and three-degrees of freedom MEMS have been described. For instance, a Fresnel microlens on a platform that can move linearly in 3 directions by means of hinged polysilicon plates is disclosed in Fan L. et. al, "*Self-assembled Microactuated XYZ Stages for Optical Scanning and Alignment*", Proceedings of International Solid State Sensors and Actuators Conference (Transducers '97), Chicago, Ill., USA, 1997, pp. 319-322.

However, for some applications, a structure is required that can impart motions in six degrees of freedom to an active device, e.g. a sensing or scanning device. For instance, a MEMS robot may be required to guide a missile while tracking a target; or to track the path of a flying body; or to provide extensive and remote-controlled imaging of an area; or to provide an optical switch in a complex optical device; or to effect optical scanning of any particular object; and the like. In order to fulfill such tasks, a MEMS structure capable of imparting six degrees of motion to an active or passive device must be provided. As far as we know, in spite of the development of the MEMS technique, no such structure has yet been developed.

The present invention provides a structure for a parallel robot in which a motion, although limited, can be provided to its main plate in six degrees of freedom. The robot of the present invention is adapted for cases in which the use of complicated components is limited, or impossible, for some reason. One of such cases is the MEMS technology, which still does not enable use of all types of components which can be used by the conventional technology. The robot of the present invention is comprised of only simple components, such as plates, simple joints and hinges, and linear motors, all of which are available in MEMS technology.

It is therefore a purpose of this invention to provide a structure—hereinafter called a "robot", or a "micro-robot", capable of imparting six degrees of motion to a main plate, which may support, for example an active device or any other component for which motion in six degrees of freedom is desired.

It is a further purpose of the present invention to provide such a robot that is actuated by relatively simple actuators, hereinafter also referred to as motors.

It is another purpose of the invention to provide a process for making such a robot by MEMS techniques.

It is a still further purpose to provide a process for making a robot or micro-robot that fulfills the above purposes.

Other purposes and advantages of the invention will appear as the description proceeds.

SUMMARY OF THE INVENTION

The present invention relates to a mechanical structure for providing motion in six degrees of freedom, which comprises:
 a. A main plate;
 b. A base;
 c. At least three supporting structures, each comprising a lower, bridge-like section supported by the base, and a upper section connected to said bridge section by means of a first hinge and to said main plate by means of a second hinge wherein:
  I) Said bridge-like structure comprising two supporting plates, two intermediate plates, and one middle plate, all being serially connected one to another by means of four transversal hinges;
  II) Each pair of said supporting plates being slidable in linear displacement parallel to the base;
  III) Said upper section comprising two plates, a lower plate connected to said middle plate by means of a hinge transversal to said lower plate but longitudinal with respect to said middle plate, and an upper plate connected to said lower plate by means of a longitudinal hinge and to said main plate by means of a transversal hinge;
 d. At least six linear motors connected each to a corresponding supporting plate, for applying a force thereon in order to effect a linear displacement of said plate; and
 e. Control means for determining the linear displacement of each linear motor.

In one embodiment of the invention, the robot comprises three supporting structures and six motors.

Preferably, the three supporting structures are located symmetrically with respect to the main plate.

Preferably, the three supporting structures are located symmetrically with respect to the base.

Preferably, each of the linear motors is capable of linearly displacing a supporting plate of the supporting structure in either of two opposite directions.

Preferably, the structure further comprises a control unit.

Preferably, the control unit is provided with displacement sensors connected to the main plate or to the six supporting plates for providing input to the control unit, thereby controlling the operation of the robot in closed loop.

Preferably, the control unit is an electronic processor.

Preferably, when the robot has three supporting structures, each pair of supporting plates which belong to one supporting structure is disposed along one side of a triangle. Preferably, the triangle is an equilateral triangle.

Preferably, when the robot has three supporting structures, the main plate has a hexagon shape.

The present invention also relates to a process for making a MEMS micro-robot as disclosed above, which comprises the steps of:

a) Providing a semiconductor substrate;
b) Defining in said substrate, by known etching techniques, a main plate;
c) Defining three supporting structures, each comprising a plurality of plates, that are connected one to the other by means of a simple hinge;
d) Providing 6 linear motors, two for each supporting structure;
e) Providing, for each linear motor, the required connections to the corresponding plate of the supporting structure; and
f) Raising the plate and the supporting structures perpendicularly of the substrate.

DETAILED DESCRIPTION OF PREFERRED EMBODIMENTS

Figure 1:
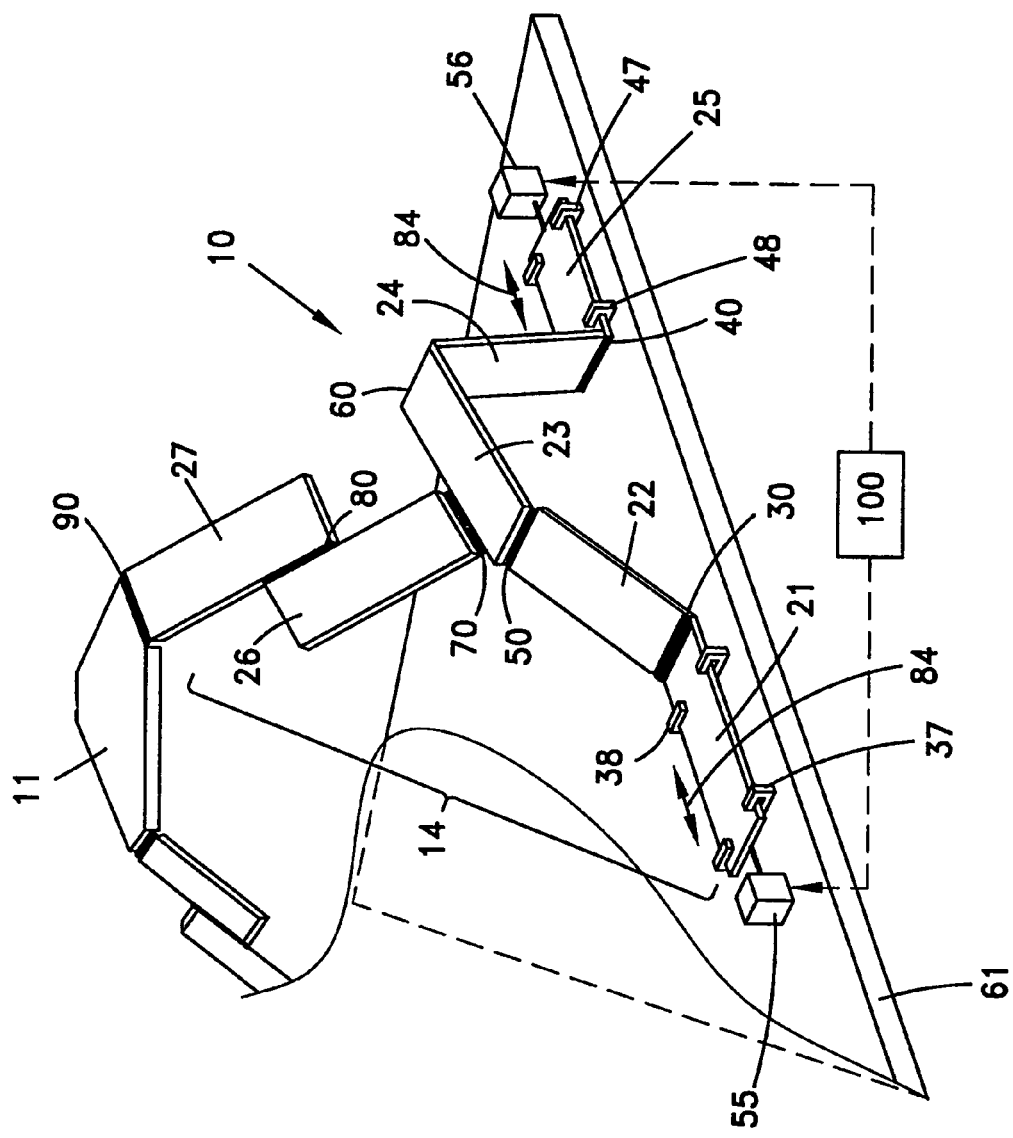
FIG. 1 shows a partial, perspective view of the robot, according to one embodiment of the invention.

FIG. 1 is a partial view showing a general structure of the robot of the present invention. Numeral 10 generally indicates the robot, and numeral 11 is the main plate thereof, schematically indicated as hexagon, which may be a portion of a larger plate. Plate 11 is supported at three of its sides by three identical supporting structures 14. The lower portion of each supporting structure comprises 5 elongated plates 21, 22, 23, 24, and 25, that are serially connected by means of four hinge elements, forming a bridge-like arrangement. More particularly, plates 21 and 22 are connected at one of their ends by means of transversal hinge element 30, and similarly plates 24 and 25 are connected at their ends by means of transversal hinge element 40. Plates 22 and 24 are each connected at their ends to two corresponding ends of middle plate 23, by means of transversal hinge elements 50 and 60, respectively. First erected plate 26 is connected at its lower end to a side of middle plate 23, by means of hinge 70, and to a second erected plate 27 by means of side hinge 80. Finally, plate 27 is connected at its upper end to a side of hexagon 11, by means of hinge 90.

As said, two additional supporting structures 15 and 16 (not shown in FIG. 1), that are identical to the supporting structure 14, support together with structure 14 the main plate 11. The bridge elements of all said three supporting structures 14, 15, and 16 are disposed along the three sides of a preferably, but not necessarily equilateral triangle 61, which may be a portion of a larger base.

Plate 21 is positioned between guiding components 37 and 38, and similarly plate 25 is positioned between guiding components 47 and 48, purpose of which is to limit the motion of plates 21 and 25 along one respective axis. In other words, plates 21 and 25 are slidable back and forth between their corresponding guiding means as shown by arrows 84 in directions parallel to the adjacent side of triangle 61. The linear displacement of said plates 21 and 25 is performed by means of two corresponding driving motors 55 and 56, each capable of providing to a corresponding plate a back or forth linear movement. Said motors are shown in FIG. 1 only in schematic form, as they may have various structures. Therefore, as a whole the robot has 6 motors like motors 55 and 56, each capable of providing a back or forth linear motion to the corresponding plate.

Figure 2:
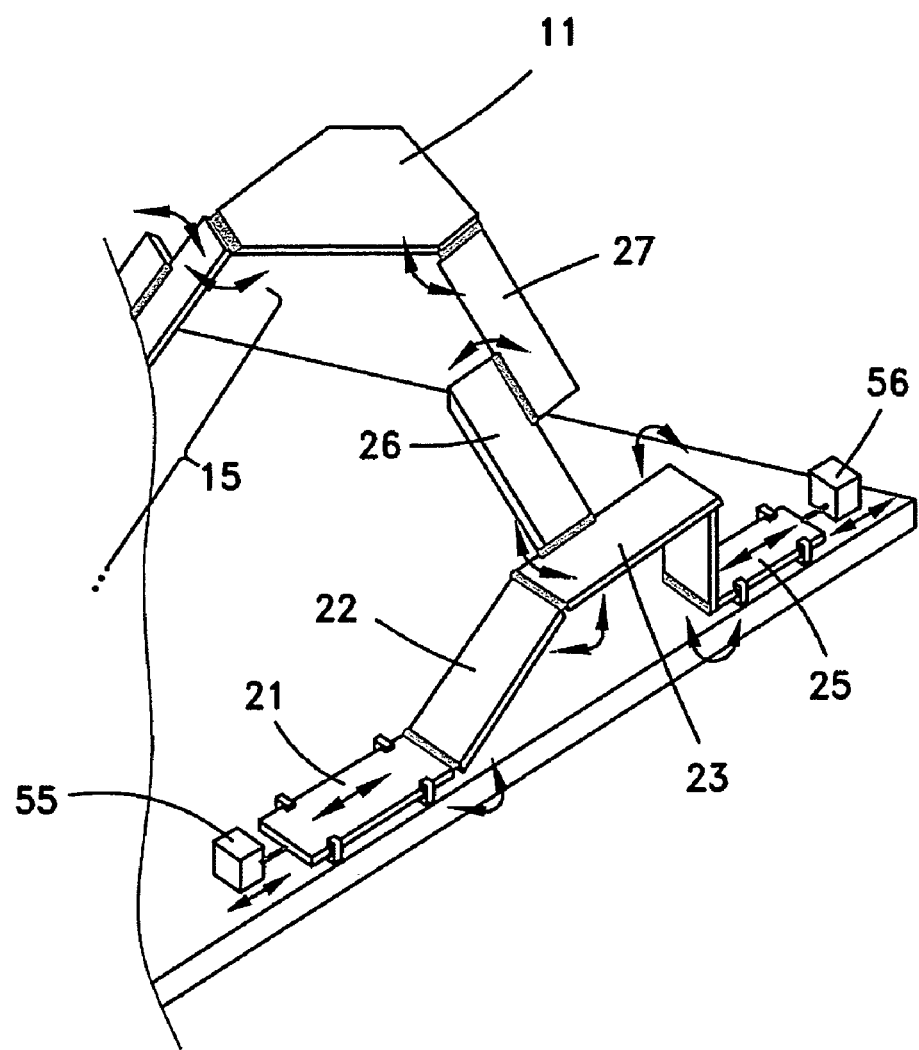
FIG. 2 shows another partial, perspective view of the robot, according to one embodiment of the invention.
Figure 3:
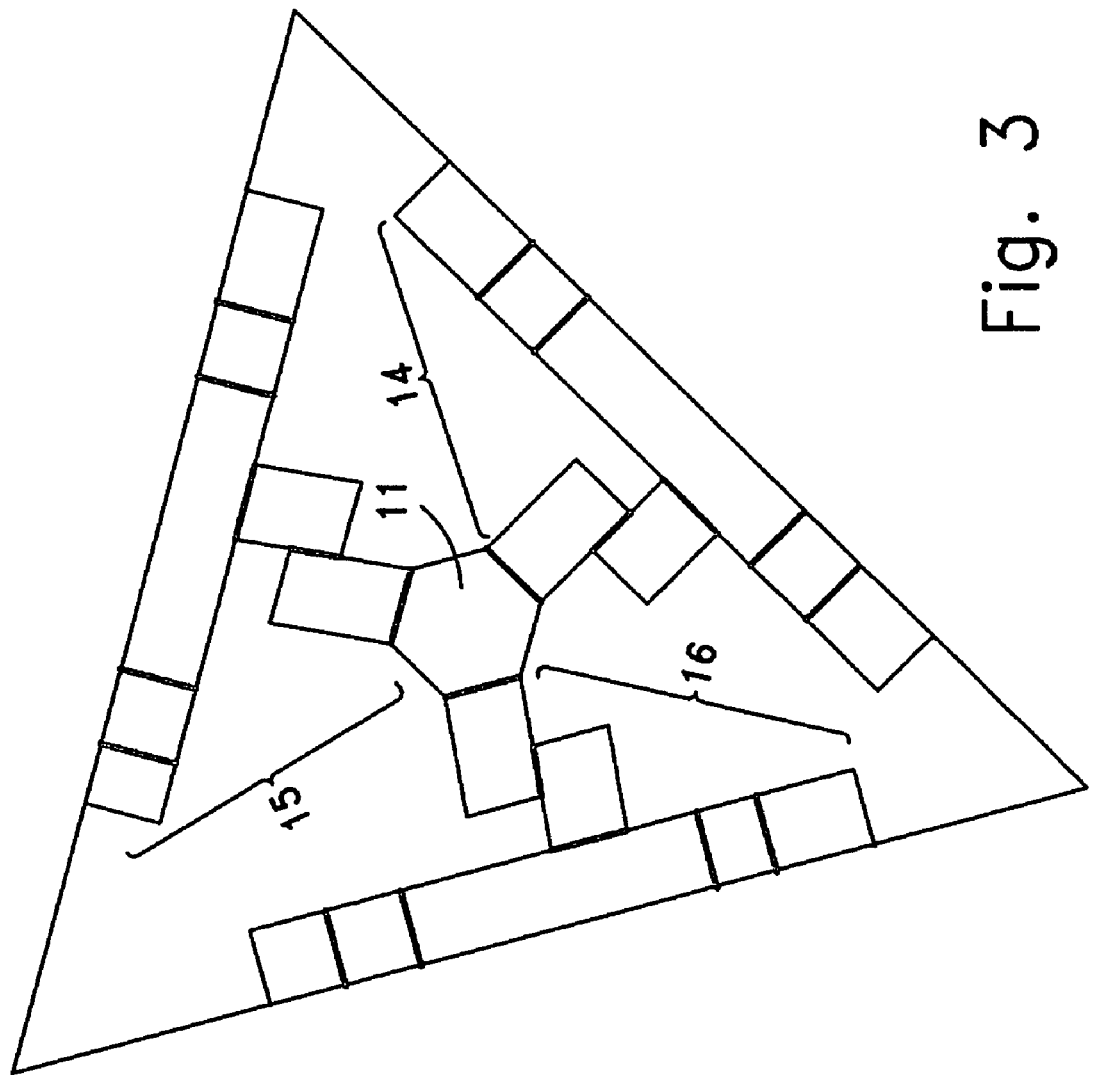
FIG. 3 shows a top view of the robot, according to one embodiment of the invention.

FIG. 2 shows the robot of the invention, in which the displacement directions of plates 21 and 25, and the rotation about each hinge element are indicated. As a result of this structure, the main plate 11 can have 6 degrees of freedom. More particularly, bridge-like arrangement 14 has 3 degrees of freedom. Together with plates 26 and 27, each supporting structure 14, 15, and 16 has 5 degrees of freedom, and together 15 degrees of freedom. The connecting of the main plate 11 to supporting structure 14 adds one more degree of freedom, i.e., adds the total to 16 degrees of freedom (without considering the connections of supporting structures 15 and 16 to the main plate 11). Connecting of supporting structure 15 to the main plate 11 deducts 5 degrees of freedom (as hinge 90 has one degree of freedom), and likewise connecting of supporting structure 16 to the main plate 11 deducts additional 5 degrees of freedom, so as a total, the robot of the invention has 6 degrees of freedom.

It should be noted that, theoretically, in some operating state conditions the robot may collapse. For example, in FIG. 1 if plate 21 is stationary while plate 25 is pushed to the left, thereby pushing bottom of plate 24 far to the left and top of plate 24 too far to the right, beyond the perpendicular state of said plate 24 with respect to the base, the robot may collapse. Therefore, some states of the robot that may cause collapse or undesired motion are defined in singular states. These are illegal states, which should be eliminated. This is a relatively easy task, as the 6 driving motors of the robot are of course operated and controlled by means of a control unit (100 in FIG. 1) that activates each of said 6 motors. Proper coordination between the operations of the six motors can easily eliminate said illegal states (also referred herein as "singular states").

The structure of the robot is stable in the sense that each validly defined state of the motors corresponds to only one state of plate 11, and as said, the translation and orientation of plate 11 may be changed in six degrees of freedom by changing the states of plates 21 and 25 of supporting structure 14 (and similarly the states of the other 4 similar plates of supporting structures 15 and 16 by means of their 4 corresponding motors).

It should be noted that the robot plate elements 21-27 have been shown in the drawings as, rectangular, planar plates. This has been done only for the sake of illustration, as one skilled in the art may use other forms for these elements. Also, the main plate 11 may have another shape, for example a circular shape.

The main plate, the plates, as well as the base, may be made of a semiconductor or metal, e.g. silicon, polysilicon, aluminum, etc.

Figure 4:
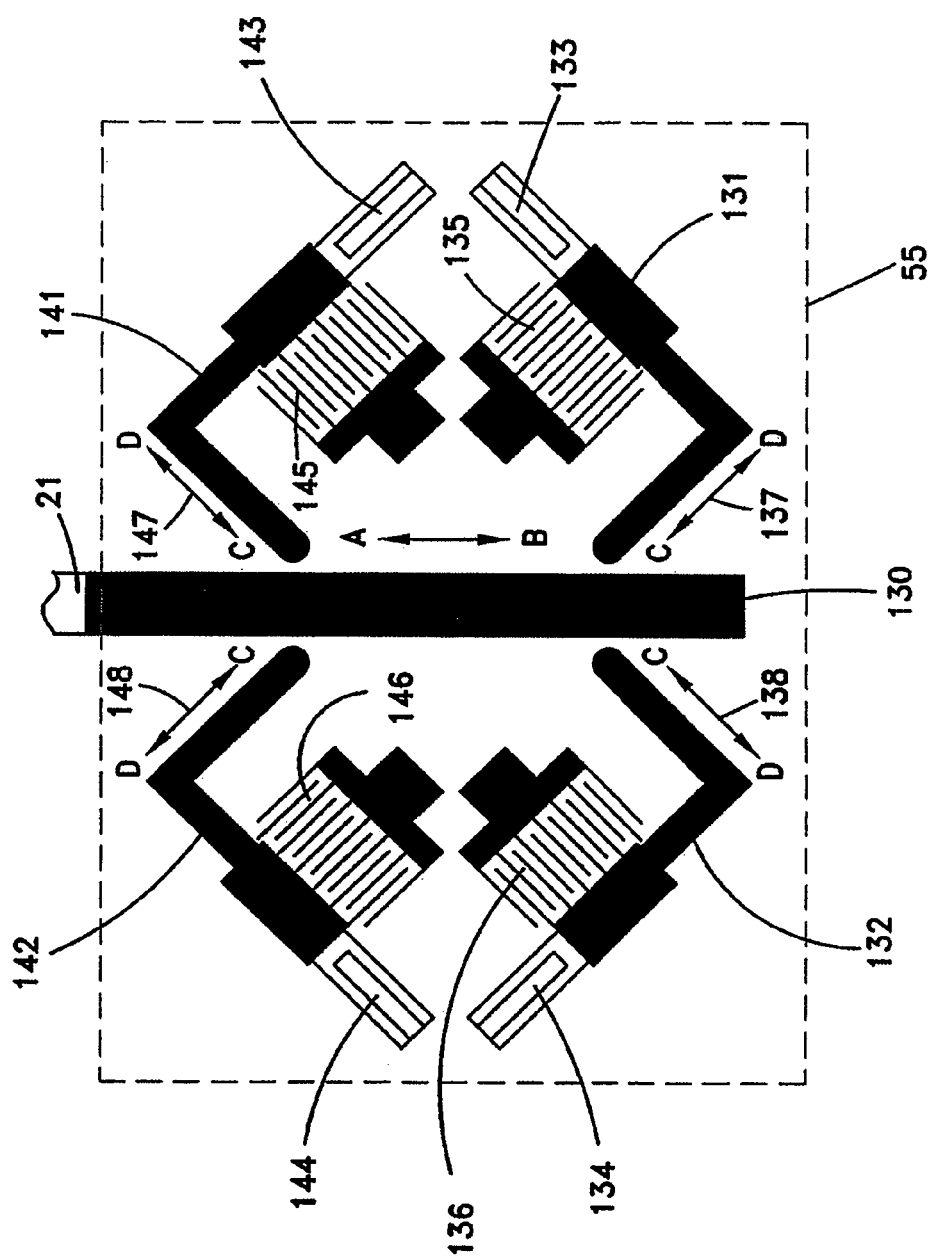
FIG. 4 shows in schematic form the structure of a MEMS linear motor that can be used for displacing a supporting plate of a micro-robot having the structure of the robot of the invention.

While various kinds of linear actuating means may be used to displace the six plates 21 and 25 of the 3 supporting structures 14, 15, and 16, when embodying the invention in MEMS technology, one preferred motor is disclosed in Daneman et. al., "*Linear Vibromotor for Positioning Optical Components*", Journal of Microelectromechanical Systems, Vol. 5, No. 3, September 1996, pp. 159-165, and is shown by way of illustration in the schematic plan view of FIG. 4. The linear motor 55 (and likewise the other 5 motors) comprises a rod 130, which is actuated by two pairs of cranks 131-132, and 141-142. When displacement of plate 21 is needed either the first crank pair composed of cranks 131-132, or the second crank pair which composed of cranks 141-142 is activated depending on the displacement direction needed. The two cranks of each pair, when activated, bear on opposite sides of rod 130, and by such apply force on rod 130. The two opposite crank force components that are perpendicular to rod 130 balance each other, while the components that are parallel to rod 130 contribute one to the other, and by effecting a frictional contact with rod 130 cause a linear displacement of rod 130 and the plate (for example 21) attached to it. The cranks are activated by providing a voltage potential to the respective pair (135-136 or 145-146) of comb resonators, thereby causing the respective pair of cranks to move in directions 137-C and 138-C or 147-C and 148-C, respectively. When the potential supply is terminated, the corresponding pair of folded beam springs (133-134 or 143-144) causes the cranks to return to their previous position by moving in directions 137-D and 138-D or 147-D and 148-D, respectively. The first pair 131-132 can be activated to shift the rod 130 in direction A while the second pair 141-142 is inactive; the second pair 141-142 can be activated to shift the rod 130 in direction B while the first pair 131-132 is inactive.

Another MEMS linear motor capable of producing linear displacements is described in U.S. Pat. No. 6,218,762. The motors 55 and 56 may have the type of motor as disclosed in said patent.

Pister et. al., "*Microfabricated Hinges*", Sensors and Actuators A-Physical, Vol. 33, No. 3, 1992, pp. 249-256, discloses a type of hinge that can be used for the simple hinges 30, 40, 50, 60, 70, 80, and 90 when embodying the invention in MEMS technology.

The combination of the displacement of the six linear devices determines the displacements of plates 21 and 25 (of the three supporting structures 14, 15, and 16), and therefore the displacements and tilts of the following plates, enabling displacement and tilt of the main plate 11 in six degrees of freedom. Said combination is controlled by a control device, which may be, e.g., an electronic processor. The processor may operate according to a predetermined program. Moreover, the operation of the robot may preferably be controlled in a conventional, closed loop manner by providing displacement sensors at the main plate 11, each of the plates 21 or 25, or at the six motors.

In one example the main plate 11 may support a CCD camera. If an extensive area of terrain is to be explored and photographed, a program may determine the displacements of the robot required for the camera to fully accomplish the task assigned to it. In this case, the analog or digital values defining the photograph will be transmitted to a processing and/or registering device that is outside the robot. The transmission means can be conventional, including electrical conductors and/or optical fibers, and need not be described. The micro-robot will perform a purely active function: to direct and focus the camera according to a program.

In other cases, however, the data gathered by a sensing device may determine the operation of the micro-robot. For instance, the CCD camera or other sensing device may follow a moving object, e.g. an airplane, and the motion of the object at any moment may determine the successive motions required of the robot supporting the camera to continue tracking the object, and therefore determine the commands that are to be given to the robot to produce its required motions. If so, the data gathered by the sensing device will be transmitted to a processor, as in the previous case, but the processor will operate according to a program only insofar as the program determines the commands to be given to the robot as a function of the data received from the sensing device. The function of the robot is preferably controlled by a closed loop.

The main plate 11 may also support an optical device such as a CCD camera, or a microcircuit capable of performing most or all of the required processing.

It should be noted that although the robot of the invention has been described having three supporting structures, and six linear motors, this is only a minimal structure. The robot of the invention may likewise comprise more than three supporting structures. A robot with more than three supporting structures may be advantages for: (a) better avoiding singular states; (b) better removing the robot from singular states that it may face; and (c) obtaining better positioning accuracy, for example in view of some clearance that the hinges may have. Furthermore, some or all of the robot plates or hinges may be flexible.

The process of making a MEMS micro-robot according to the invention, preferably comprises:
 a) Providing a semiconductor substrate;
 b) Defining in said substrate, by known etching techniques, a main plate;
 c) Defining three supporting structures, each comprise a plurality of plates, that are connected one to the other by means of a simple hinge;
 d) Providing 6 linear motors, two for each supporting structure;
 e) Providing, for each linear motor, the required connections to the corresponding plate of the supporting structure; and
 f) Raising the plate and the supporting structures perpendicularly of the substrate.

Examples and preferred embodiments of the invention and of its manufacture have been given for purposes of illustration, but it will be apparent that the invention can be carried into practice by skilled persons with many modifications, variations and adaptations, without exceeding the scope of the claims.

The invention claimed is:

1. Mechanical structure providing motion in six degrees of freedom, which comprises:
 a. A main plate;
 b. A base;
 c. At least three supporting structures, each comprising a lower bridge section supported by the base, and an upper section connected to said bridge section and to said main plate, wherein:
  I) Said bridge section comprising two supporting plates, two intermediate plates, and one middle plate, all being serially connected one to another by four hinges;
  II) Each pair of said supporting plates being slidable in linear displacement parallel to the base;
  III) Said upper section comprising two plates, a lower plate connected to said middle plate by a fifth hinge transverse to said lower plate but longitudinal with respect to said middle plate, and an upper plate connected to said lower plate by a sixth hinge longitudinal and connected to said main plate by a seventh hinge;
 d. At least six linear motors, wherein each of said linear motors is connected to one of said supporting plates, for applying a force thereon to effect a linear displacement of said plate; and
 e. A control unit for determining the linear displacement of each linear motor.

2. Structure according to claim 1, having three supporting structures and six linear motors.

3. Structure according to claim 2, wherein the three supporting structures are located symmetrically with respect to the main plate.

4. Structure according to claim 2, wherein the three supporting structures are located symmetrically with respect to the base.

5. Structure according to claim 2, wherein the main plate has a hexagon shape.

6. Structure according to claim 1, wherein each of the linear motors is capable of linearly displacing one of said supporting plates of the supporting structure in either of two opposite directions.

7. Structure according to claim 1, wherein the control unit is an electronic processor.

8. Structure according to claim 1, wherein each pair of supporting plates which belongs to one supporting structure is disposed along one side of a triangle.

9. Structure according to claim 8, wherein the triangle is an equilateral triangle.

10. Structure according to claim 1, wherein at least one of the plates is flexible.

11. A process for making a MEMS micro-robot having the structure of claim 1, the process comprising the steps of:
 a) Providing a semiconductor substrate;
 b) Defining said main plate in said substrate, by etching;
 c) Defining said three supporting structures, wherein each of the supporting structures comprises said plurality of plates connected one to the other by said hinges;
 d) Providing said six linear motors, wherein two of said linear motors are provided for each of said supporting structures;
 e) Providing, for each linear motor connections to the corresponding plate of one of the supporting structures; and
 f) Raising the main plate and the supporting structures perpendicularly off the substrate.

* * * * *